United States Patent
Chen

[19]

[11] Patent Number: 6,164,157
[45] Date of Patent: Dec. 26, 2000

[54] BICYCLE CRANKSET

[76] Inventor: Hsing-Lung Chen, 14 Lane 460, Section 2, Chan Shui Road, Chi Fuh Township, Chan Hua Hsien, Taiwan

[21] Appl. No.: 09/352,756

[22] Filed: Jul. 14, 1999

[51] Int. Cl.[7] .......................................................... F16C 9/02
[52] U.S. Cl. ............................................................... 74/594.1
[58] Field of Search ................................ 74/594.1, 594.2; 384/545, 538

[56] References Cited

U.S. PATENT DOCUMENTS 4,950,521   8/1990   Takamura et al. .

FOREIGN PATENT DOCUMENTS

| 17427 | of 1893 | United Kingdom | 384/545 |
| 713012 | 8/1954 | United Kingdom | 384/545 |
| 2135399 | 8/1984 | United Kingdom | 74/594.1 |

*Primary Examiner*—Mary Ann Green
*Attorney, Agent, or Firm*—Bacon & Thomas, PLLC

[57] ABSTRACT

A bicycle crankset includes a chain ring, a sleeve, two bearing sets, two bearings, two fastening nuts, two rubber washers, a retaining washer, a tightening nut, and a crank arm provided with outer threads. The crankset is mounted on the crank arm by the sleeve in conjunction with the retaining washer and the tightening nut which is engaged with the outer threads of the crank arm. The two fastening nuts are provided with a circular groove for retaining the rubber washer which is semicircular in its cross section and is provided at both edges on the flat side with an angled corner to facilitate the inserting of the rubber washer into the circular groove of the fastening nuts.

12 Claims, 6 Drawing Sheets

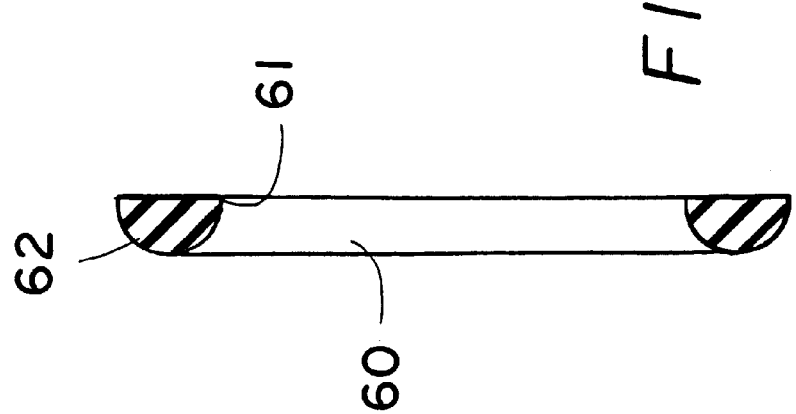
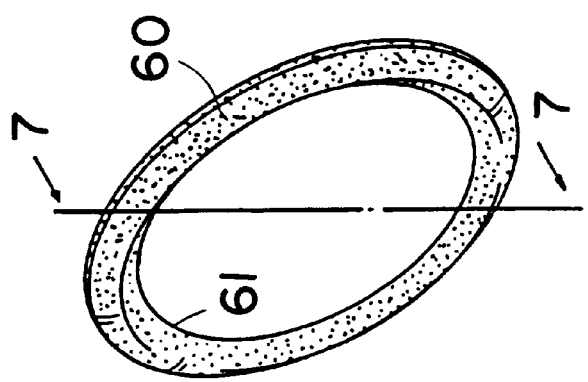

BICYCLE CRANKSET

FIELD OF THE INVENTION

The present invention relates generally to a bicycle, and more particularly to a crankset of the bicycle.

BACKGROUND OF THE INVENTION

As shown in FIGS. 1 and 2, a bicycle crankset of the prior art comprises a chain ring 1, a sleeve 2, two bearing sets 3, two bearings 4, two fastening nuts 5, two rubber washers 6, a retaining washer 7, a tightening nut 8, and a crankarm 9. The crankset is fastened on the crank arm 9 by the tightening nut 8 which is engaged with the outer threads 10 of the crank arm 9. The two rubber washers 6 have a square cross section and are intended to be lodged in the circular groove 11 of the fastening nut 5 so as to bring about the dustproof and the waterproof effects. The fastening nuts 5 are provided with a lubricating grease, which prevents the rubber washers 6 from being lodged in the circular grooves 11 of the fastening nuts 5 with precision. The quality of the prior art bicycle crankset is thus seriously undermined. In addition, the assembly of the bicycle crankset of the prior art can not be done efficiently.

SUMMARY OF THE INVENTION

The primary objective of the present invention is to provide an improved bicycle crankset which is free from the deficiencies of the prior art bicycle crankset described above.

In keeping with the principle of the present invention, the foregoing objective of the present invention is attained by a bicycle crankset comprising a chain ring, a sleeve, two bearing seats, two bearings, two fastening nuts, two rubber washers, a retaining washer, a tightening nut, and a crank arm. The two rubber washers have a semicircular cross section, which enables the rubber washers to be lodged with ease and precision in the circular grooves of the fastening nuts, thereby enhancing the efficiency of assembling the bicycle crankset.

The foregoing objective, features and functions of the present invention will be more readily understood upon a thoughtful deliberation of the following detailed description of a preferred embodiment of the present invention with reference to the accompanying drawings.

BRIEF DESCRIPTION OF THE DRAWINGS

FIG. 6 shows a perspective view of the rubber washer of the preferred embodiment of the present invention.

FIG. 7 shows a sectional view taken along the direction indicated by a line 7—7 as shown in FIG. 6.

DETAILED DESCRIPTION OF THE EMBODIMENT

Figure 1:
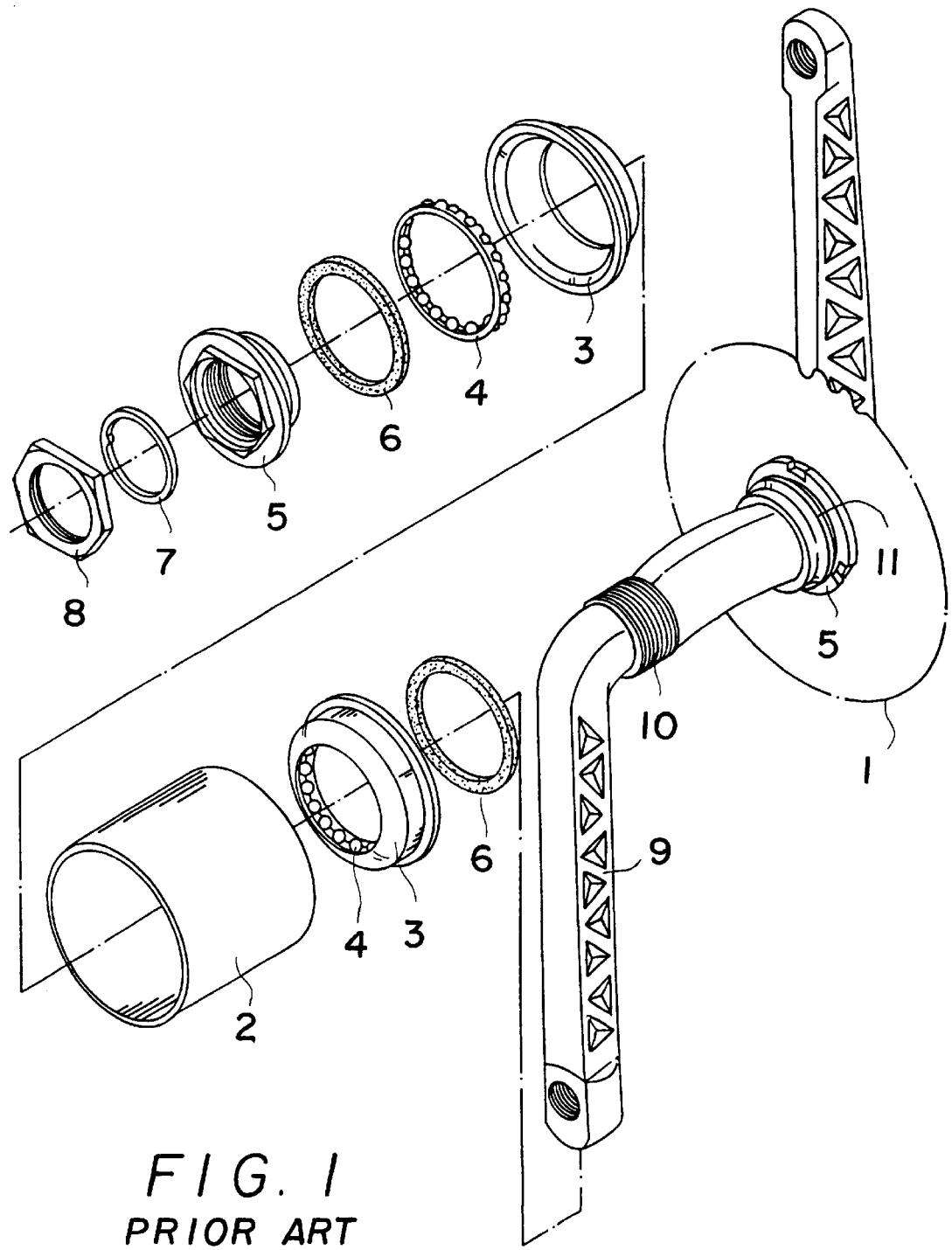
FIG. 1 shows an exploded view of a bicycle crankset of the prior art.
Figure 2:
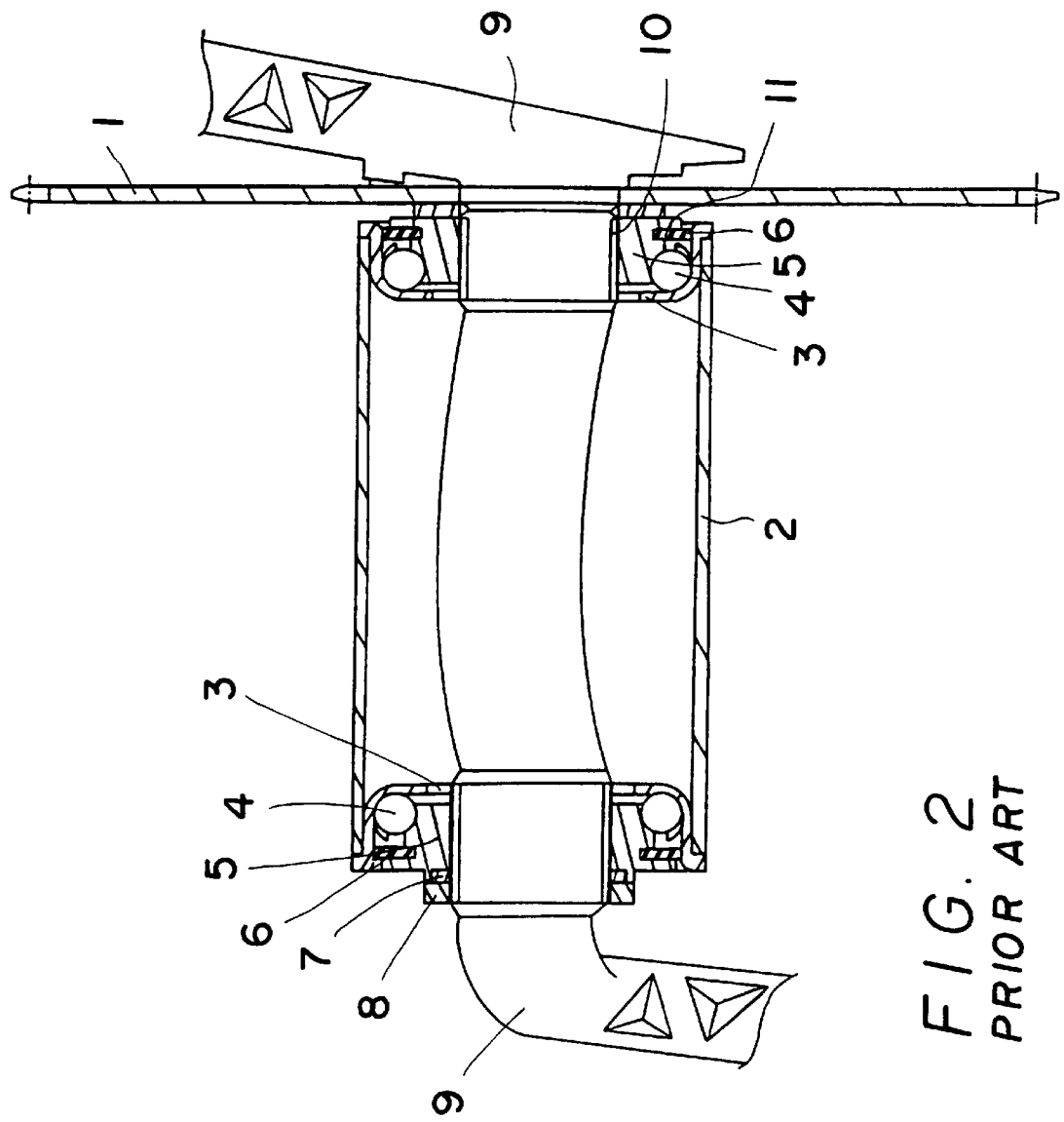
FIG. 2 shows a longitudinal sectional view of the prior art bicycle crankset in combination.
Figure 3:
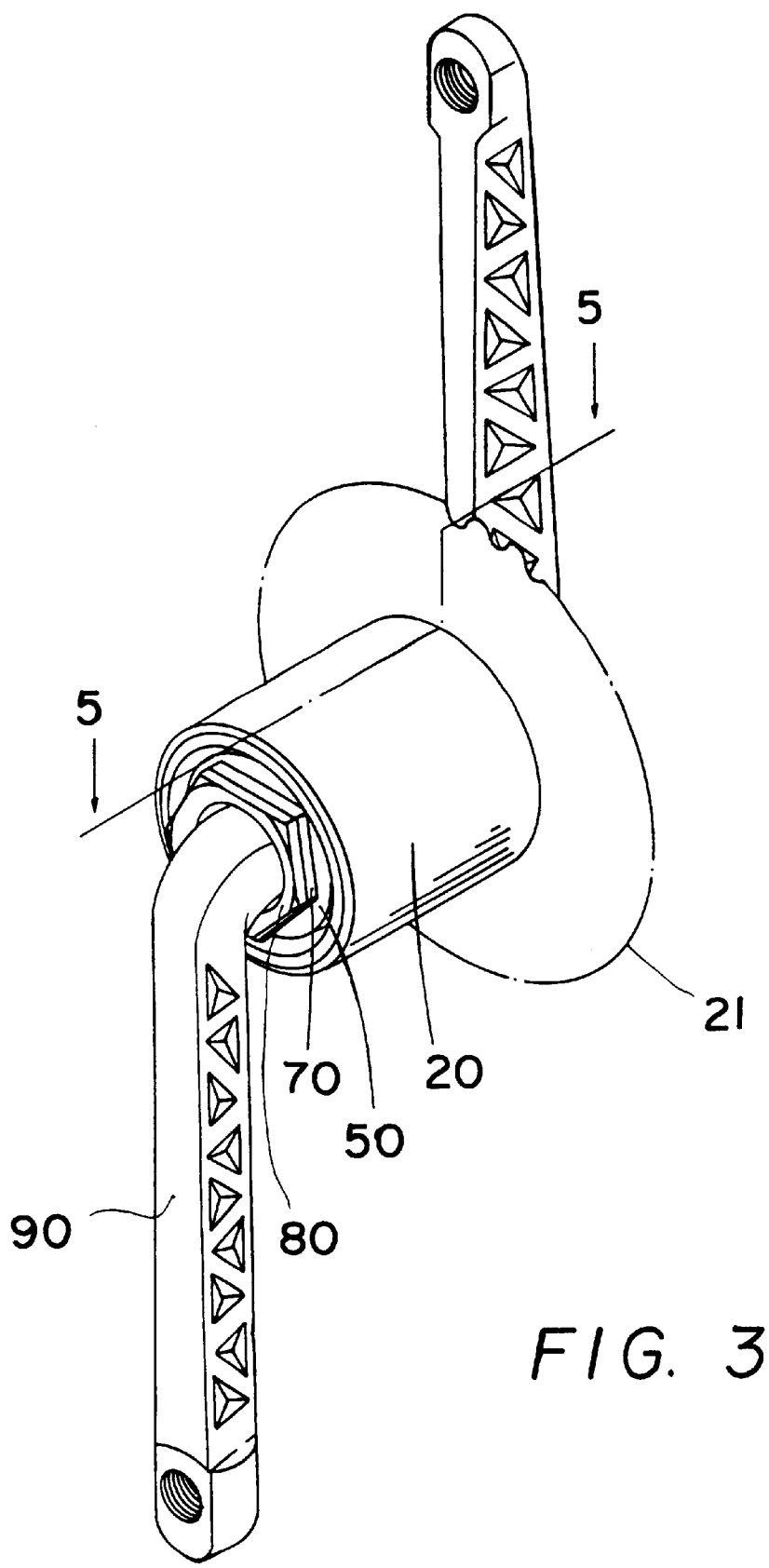
FIG. 3 shows a perspective view of a bicycle crankset of the preferred embodiment of the present invention.
Figure 4:
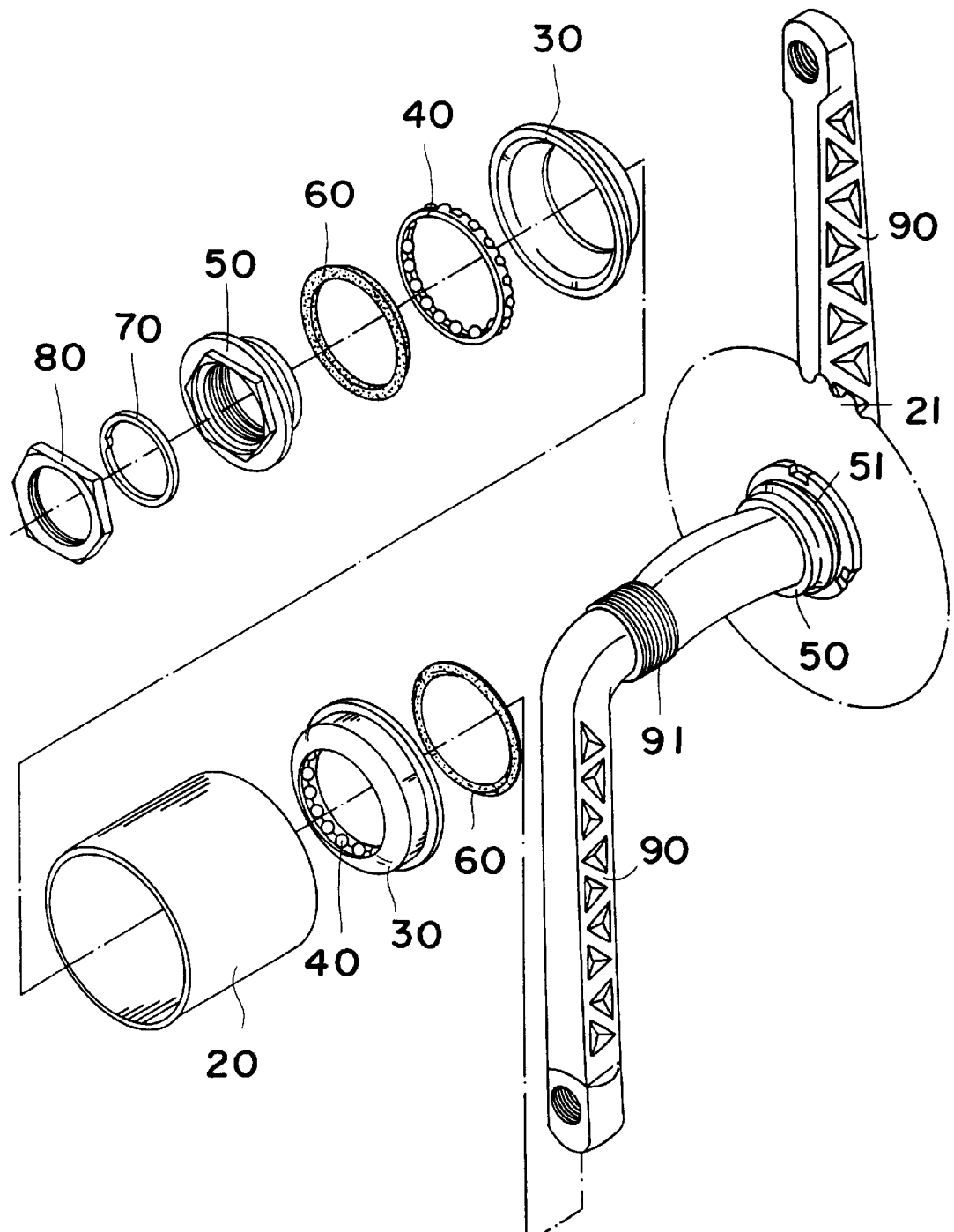
FIG. 4 shows an exploded view of the bicycle crankset of the preferred embodiment of the present invention.
Figure 5:
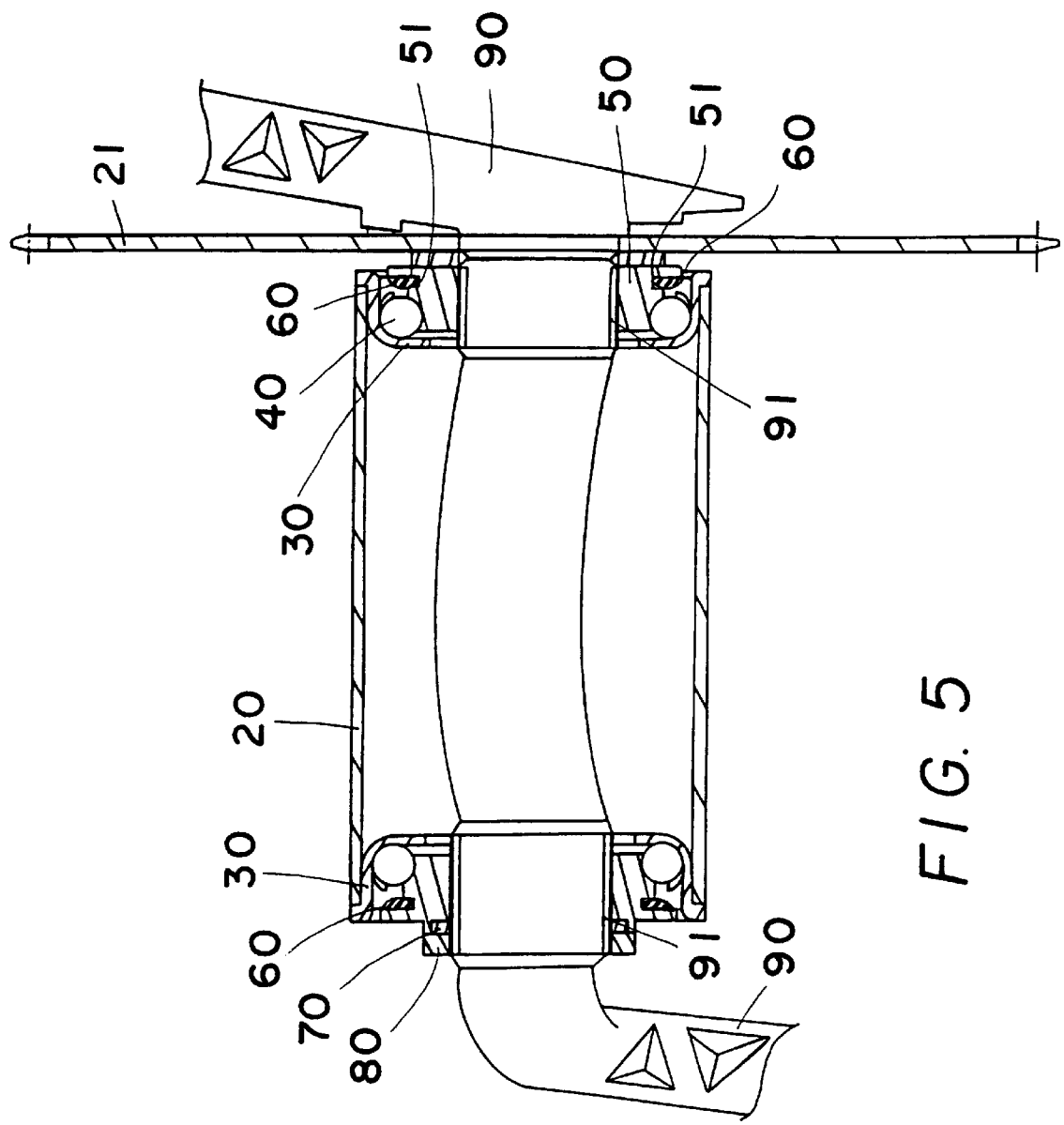
FIG. 5 shows a longitudinal sectional view of the rubber washer of the preferred embodiment of the present invention by line 5—5 as shown in FIG. 3.

As shown in FIGS. 3–7, a bicycle crankset embodied in the present invention comprises a chain ring 21, a sleeve 20, two bearing seats 30, two bearings 40, two fastening nuts 50, two rubber washers 60, a retaining washer 70, a tightening nut 80, and a crank arm 90 which is provided with a plurality of outer threads 91. The fastening nuts 50 are provided with a circular groove 51 for retaining the rubber washer 60. The crankset of the present invention is fastened with the crank arm 90 by means of the sleeve 20 in conjunction with the retaining washer 70 and the tightening nut 80 which is engaged with the outer threads 91 of the crank arm 90.

The present invention is characterized by the rubber washers 60 which have a semicircular cross section 62, as shown in FIG. 7. In addition, the rubber washers 60 are provided at both ends of the diameter of the half circle thereof with an angled corner 61 which enables the rubber washers 60 to be lodged in the circular groove 51 of the fastening nut 50 with ease and precision. Accordingly, the assembly of the bicycle crankset of the present invention can be done efficiently.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A bicycle crankset comprising a chain ring, a sleeve, two bearing sets, two bearings, two fastening nuts, two rubber washers, a retaining washer, a tightening nut, and a crank arm provided with a plurality of outer threads whereby said two bearing sets, said two bearings, said two fastening nuts, said two rubber washers are fastened on said crank arm by said sleeve in conjunction with said retaining washer and said tightening nut which is engaged with said outer threads of said crank arm; wherein said two rubber washers have a solid, semicircular cross section and are provided at both ends of the diameter of a half circle thereof with an angled corner.

2. The bicycle crankset recited in claim 1 wherein said rubber washers are arranged with a curved side facing each of the bearings.

3. The bicycle crankset recited in claim 2 wherein each of said fastening nuts includes a peripheral shoulder abutting one side of the rubber washers.

4. The bicycle crankset recited in claim 3 wherein said one side is a flat side that is opposite said curved side.

5. The bicycle crankset recited in claim 3 wherein each of said fastening nuts includes a groove arranged at a base of said peripheral shoulder for receiving a potion of the rubber washers.

6. The bicycle crankset recited in claim 5, wherein said one side is a flat side that is opposite said curved side.

7. The bicycle crankset recited in claim 1 wherein each of said fastening nuts includes a groove for receiving the rubber washers.

8. In a bicycle crankset including a crankarm connected to a crankshaft that is supported by a bearing arranged between a bearing seat and a fastening nut, the fastening nut having a peripheral groove for receiving a seal, wherein the improvement comprises:

the seal having a curved side and a flat side which is opposite the curved side wherein the curved and flat sides abut different walls of the groove.

9. The bicycle crankset of claim 8 wherein said different walls of the groove are opposite side walls of the groove.

10. The bicycle crankset of claim 9 wherein the curved side of said seal faces the bearing.

11. The bicycle crankset of claim 10 wherein the improvement further comprises the seal being formed from a flexible gasket material.

12. The bicycle crankset of claim 11 wherein said material includes rubber.

* * * * *